United States Patent
Baek et al.

(10) Patent No.: US 8,243,870 B2
(45) Date of Patent: Aug. 14, 2012

(54) APPARATUS FOR REMOVING THERMAL SLEEVE FROM COLD LEG OF REACTOR COOLANT SYSTEM

(75) Inventors: Won Jong Baek, Jeongeup-si (KR); Sung Ho Jang, Gwangjoo (KR); Bum Suk Lee, Jeollanam-do (KR); Ki Tae Song, Jeollanam-do (KR)

(73) Assignee: KPS Co., Ltd., Seognam-Si, Kyounggi-Do (KR)

( * ) Notice: Subject to any disclaimer, the term of this patent is extended or adjusted under 35 U.S.C. 154(b) by 356 days.

(21) Appl. No.: 12/760,060

(22) Filed: Apr. 14, 2010

(65) Prior Publication Data

US 2011/0142188 A1    Jun. 16, 2011

(30) Foreign Application Priority Data

Dec. 14, 2009   (KR) .................. 10-2009-0123774

(51) Int. Cl.
*G21C 15/00* (2006.01)
*G21C 19/00* (2006.01)

(52) U.S. Cl. ...................... 376/292; 376/352
(58) Field of Classification Search .............. 376/292, 376/293, 352; 29/282; 285/15, 16, 17
See application file for complete search history.

(56) References Cited

U.S. PATENT DOCUMENTS

| 4,006,521 | A | * | 2/1977 | Pedone | 29/282 |
| 4,400,345 | A | | 8/1983 | Pierart et al. | |
| 4,460,920 | A | * | 7/1984 | Weber et al. | 348/84 |
| 4,682,725 | A | * | 7/1987 | Martin et al. | 228/119 |
| 4,682,727 | A | * | 7/1987 | Stoll | 229/114 |
| 4,693,279 | A | * | 9/1987 | Aubert | 138/108 |
| 5,227,124 | A | * | 7/1993 | Saito et al. | 376/260 |
| 5,377,242 | A | * | 12/1994 | Carlton et al. | 376/282 |
| 5,751,778 | A | * | 5/1998 | Magnin | 376/260 |
| 5,784,426 | A | * | 7/1998 | Burner et al. | 376/260 |
| 5,867,547 | A | * | 2/1999 | Lee | 376/204 |
| 6,345,084 | B1 | | 2/2002 | Jensen | |
| 7,139,356 | B2 | * | 11/2006 | Latreille et al. | 376/260 |
| 7,203,263 | B2 | * | 4/2007 | Jensen | 376/352 |

* cited by examiner

*Primary Examiner* — Ricardo Palabrica
*Assistant Examiner* — Sean P. Burke
(74) *Attorney, Agent, or Firm* — Lucas & Mercanti, LLP

(57) ABSTRACT

Disclosed is an apparatus for removing a thermal sleeve from a cold leg of a reactor coolant system, which removes an unintentionally separated thermal sleeve without pipe cutting, preventing invasion of impurities into pipes and achieving reliable pipe re-welding. The apparatus includes a sleeve removal tool including a corn head formed at a shaft, a pressure plate below the corn head to maximize hydraulic pressure inside a safety injection pipe, a spring connected to the pressure plate to keep the pressure plate unfolded, and a guide wheel to guide the sleeve removal tool into the safety injection pipe, a horizontal movement carrier including bodies connected to each other by a link, a seating rod for seating of the sleeve removal tool, and moving wheels for movement of the horizontal movement carrier, and a vertical movement carrier including first and second anti-separation bars to prevent separation of the horizontal movement carrier.

10 Claims, 14 Drawing Sheets

【Fig. 1 A】
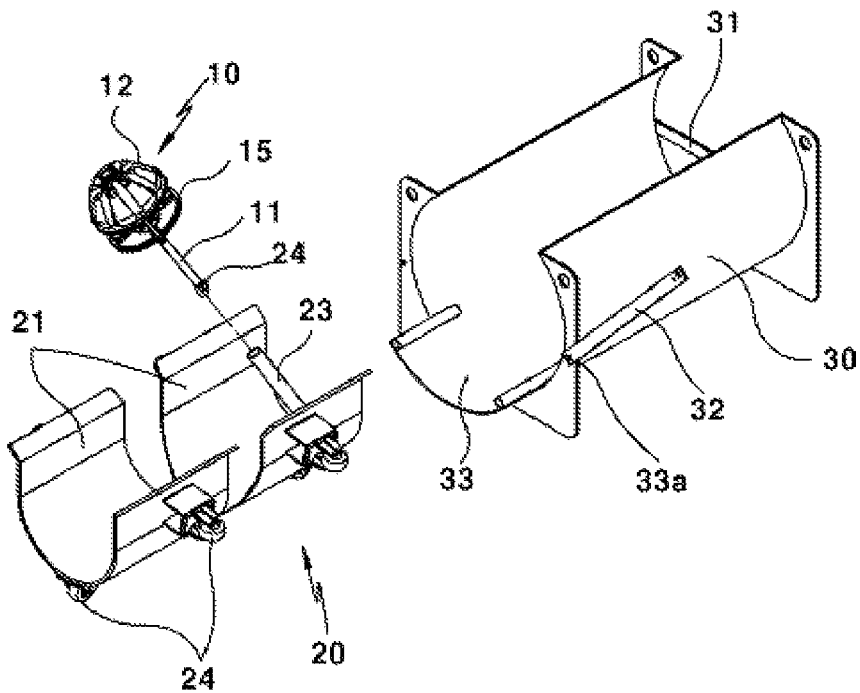
【Fig. 1 B】
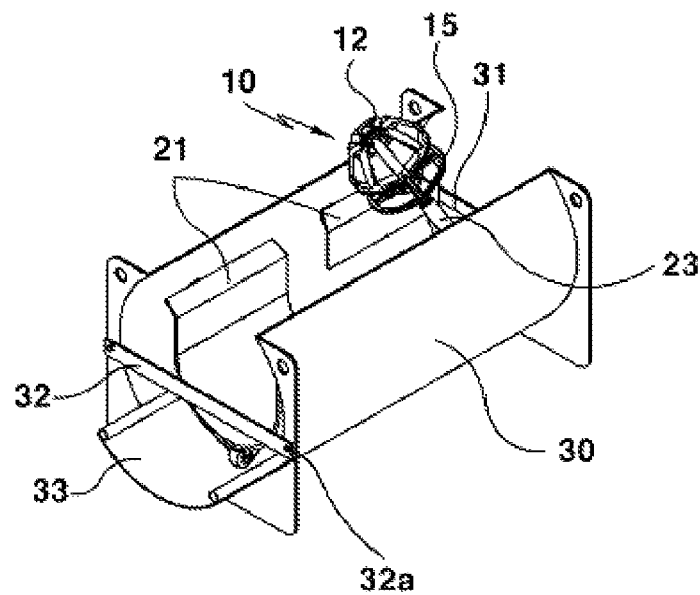

[Fig. 2 A]
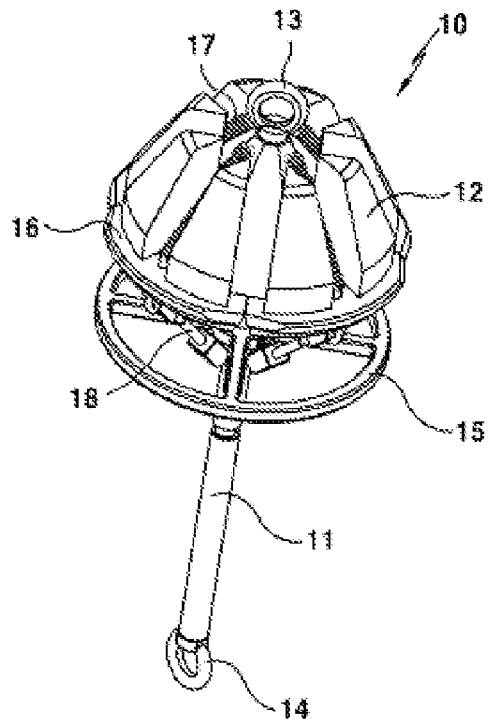
[Fig. 2 B]
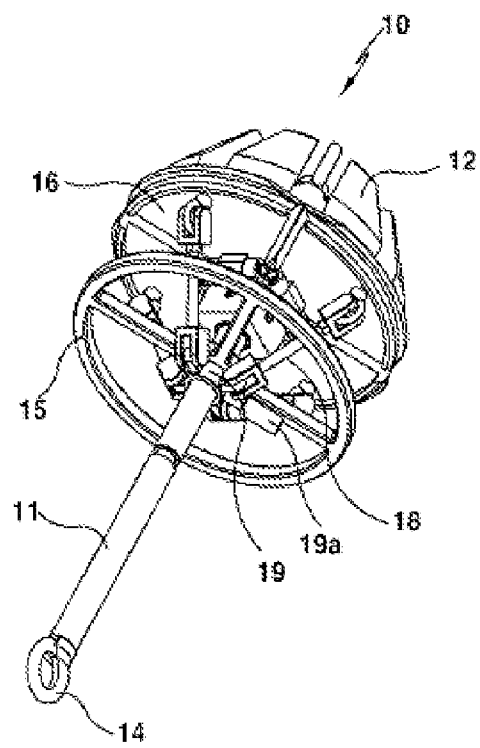

[Fig. 2C]
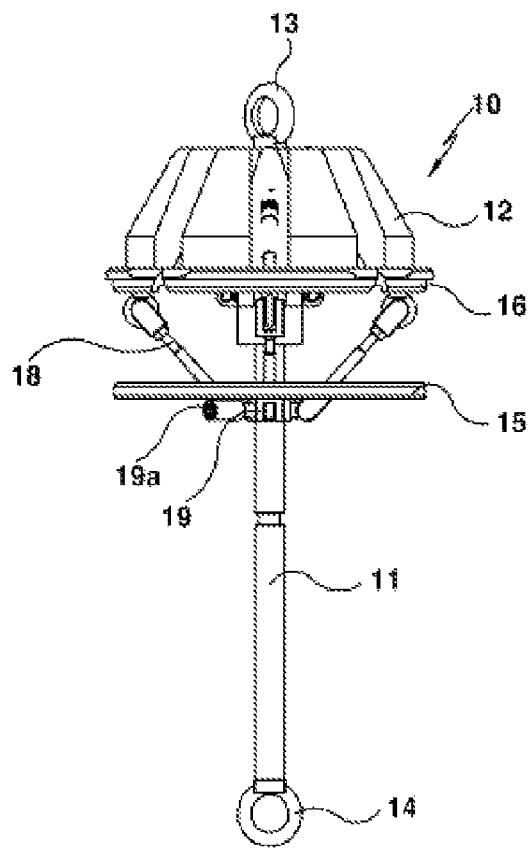
[Fig. 2D]
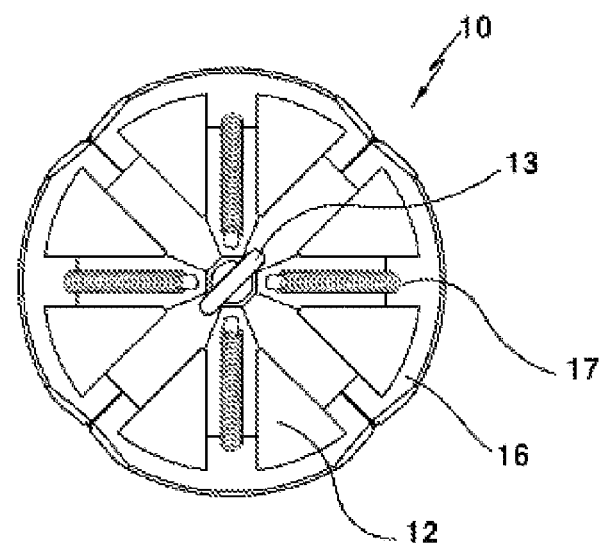

【Fig. 3 A】
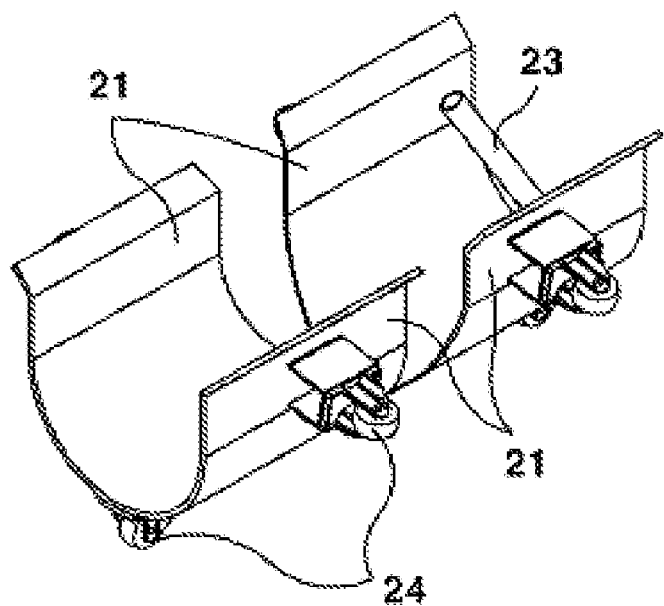
【Fig. 3 B】
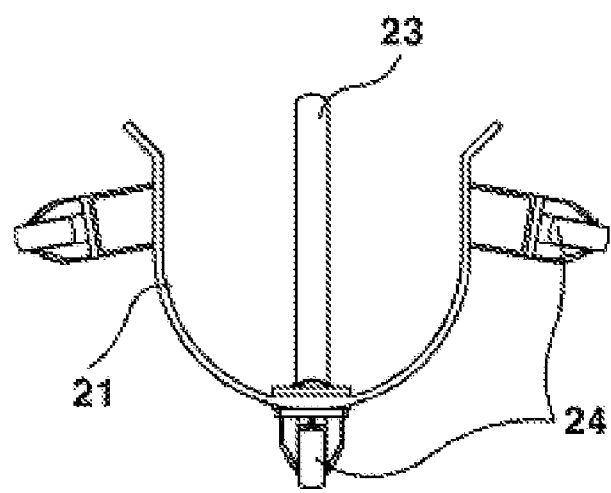

[Fig. 3C]
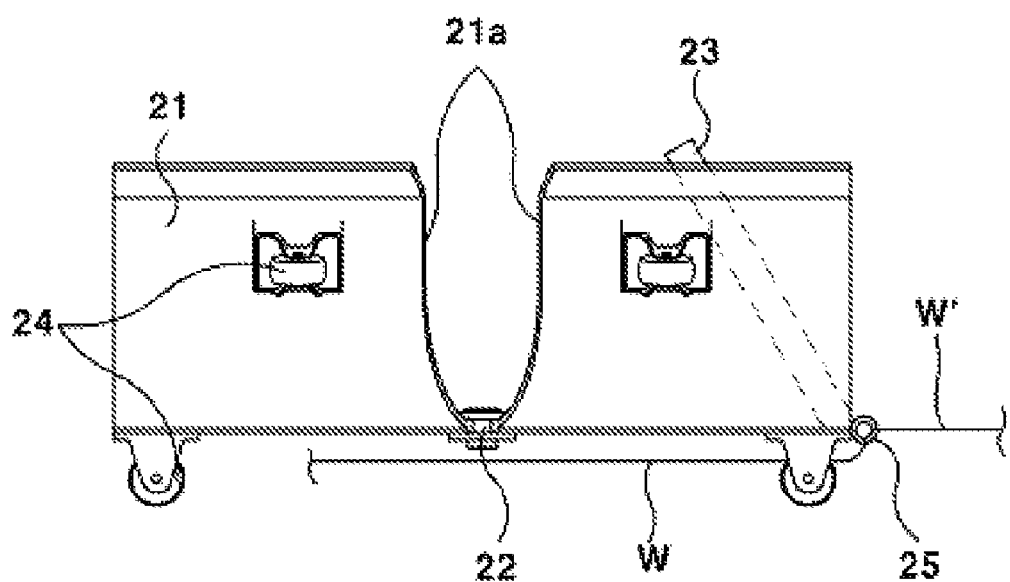

[Fig. 4A]
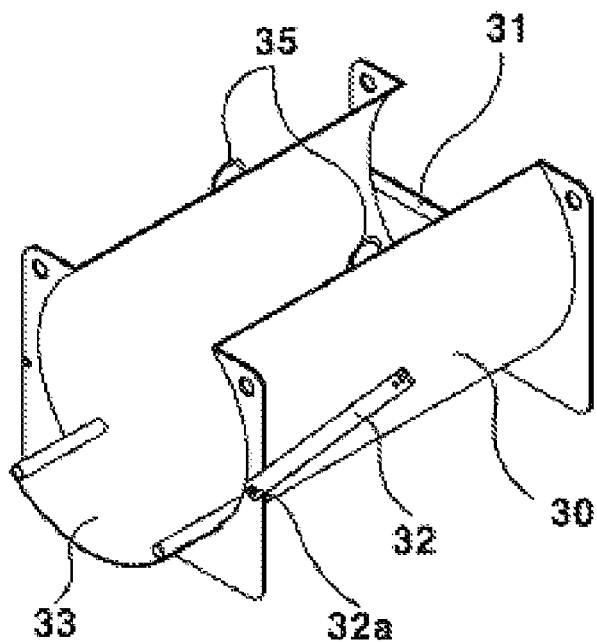
[Fig. 4B]
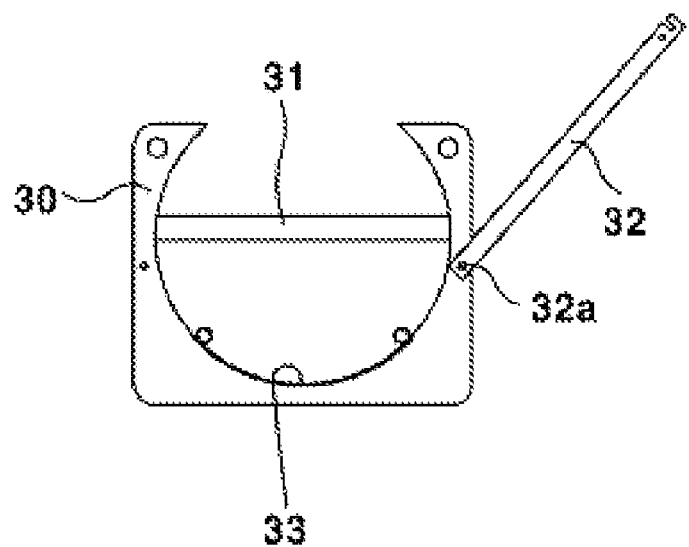

[Fig. 4C]
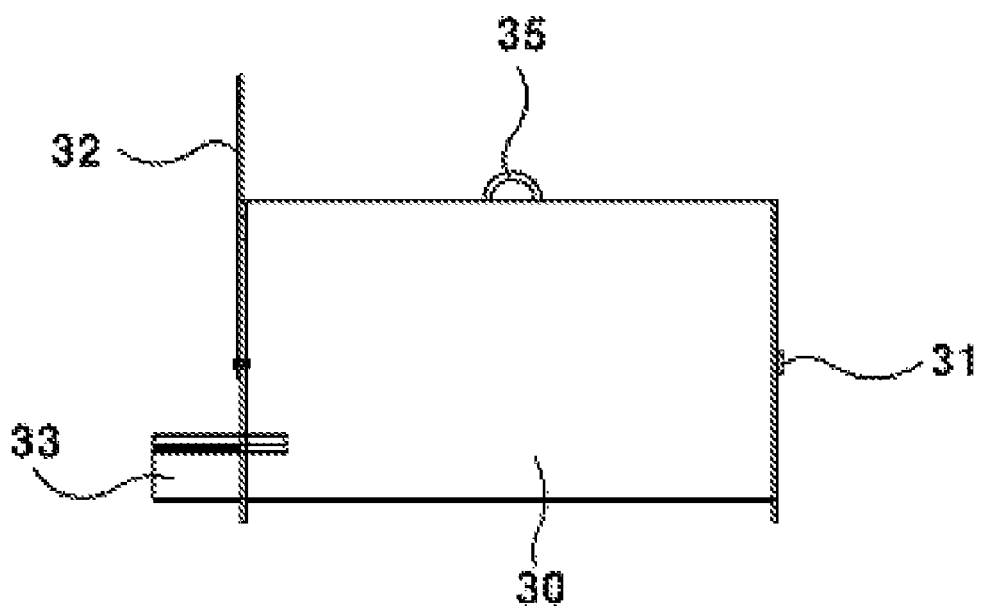

[Fig. 5A]
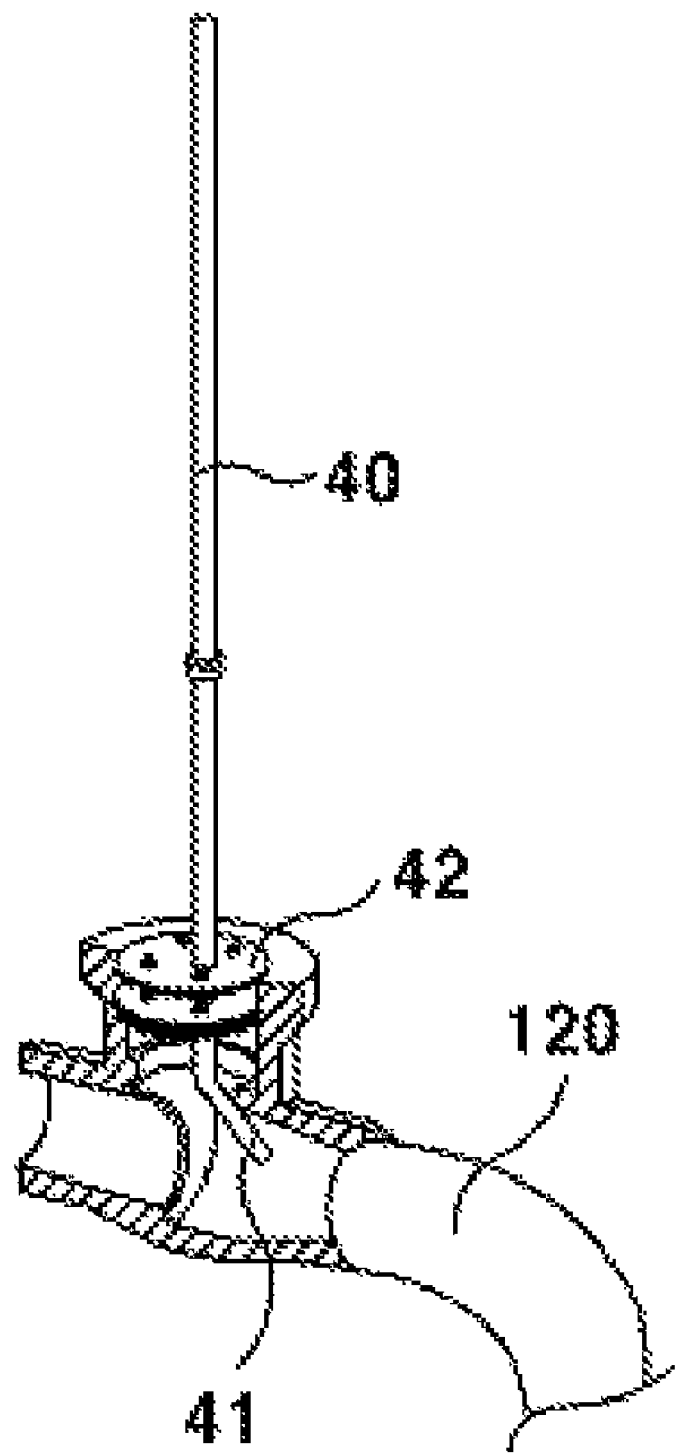

【Fig. 5 B】
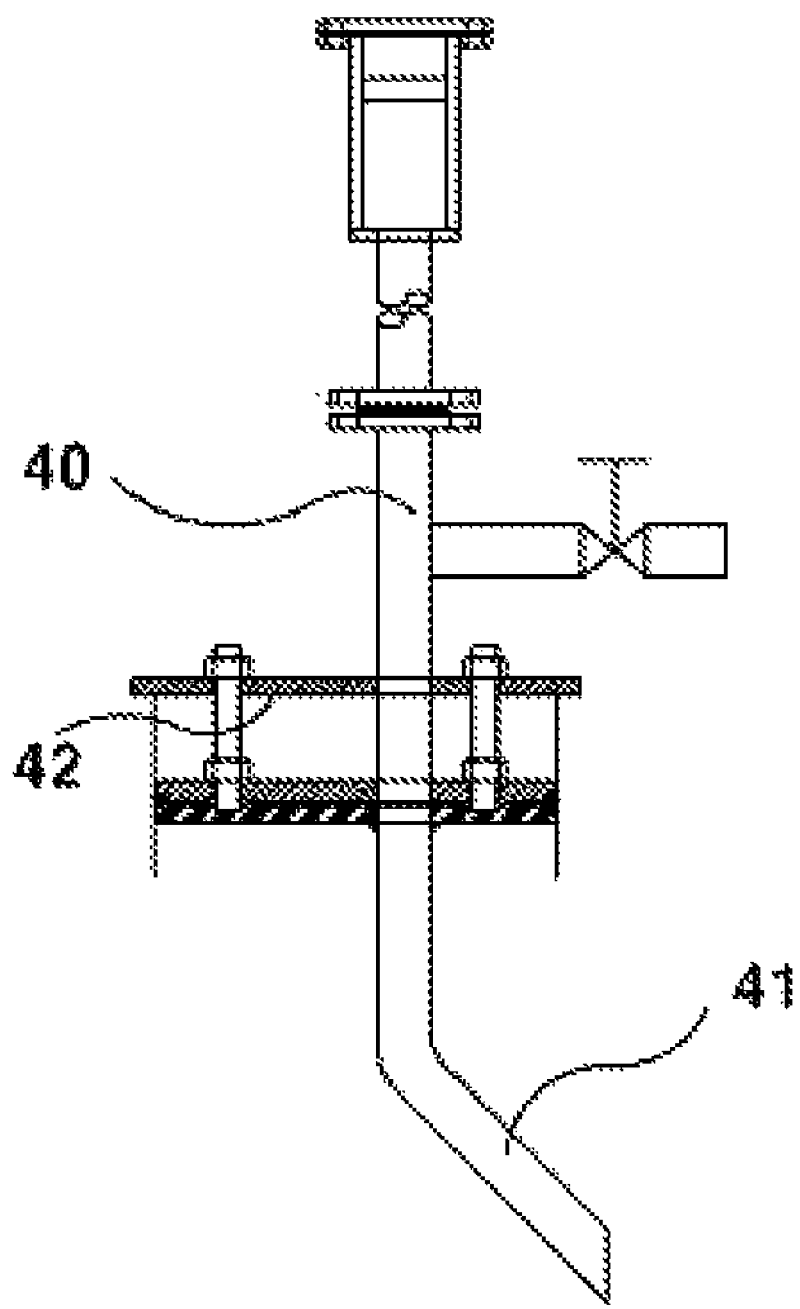

【Fig.6】
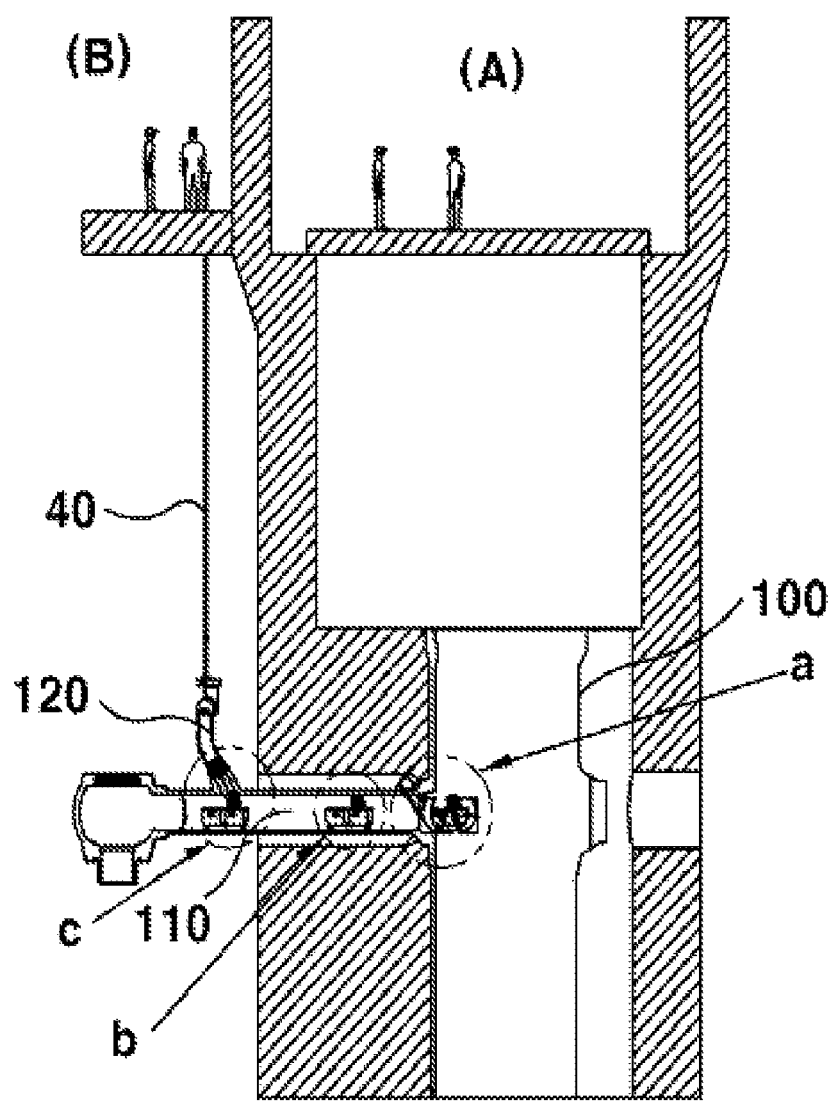

[Fig. 7]
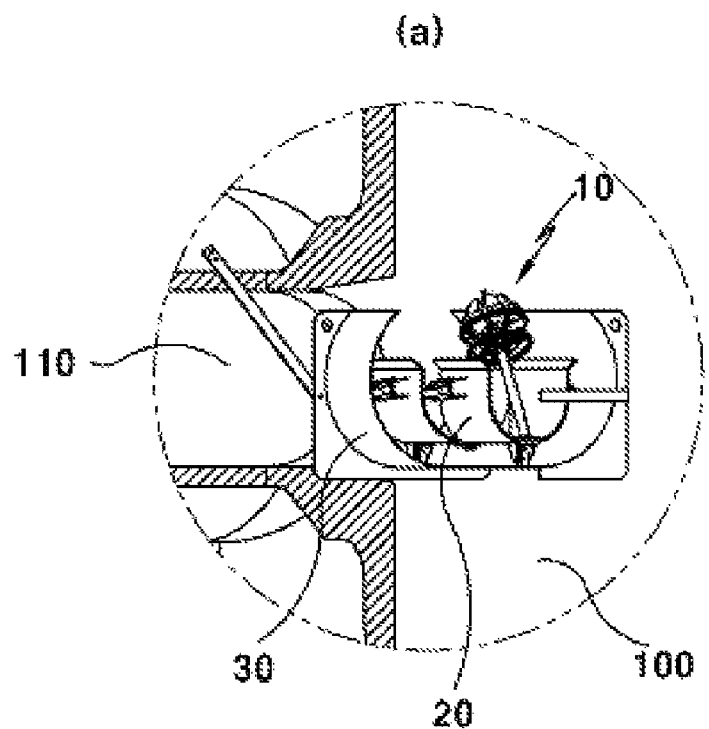
[Fig. 8]
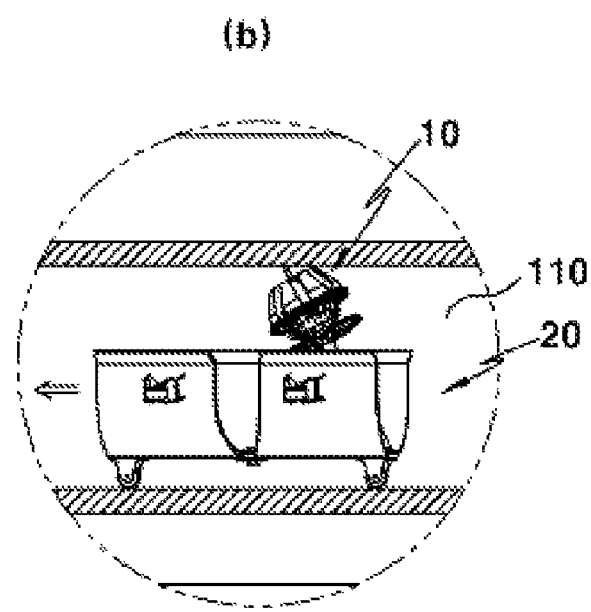

[Fig. 9]
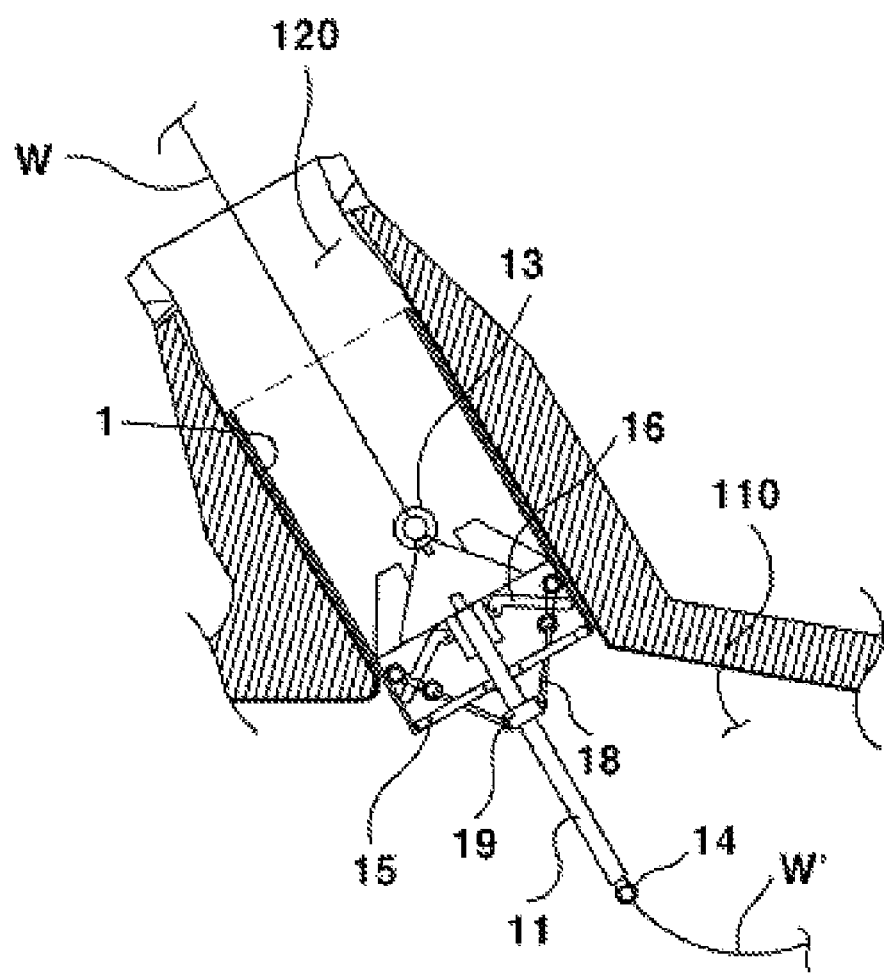

[Fig. 10]
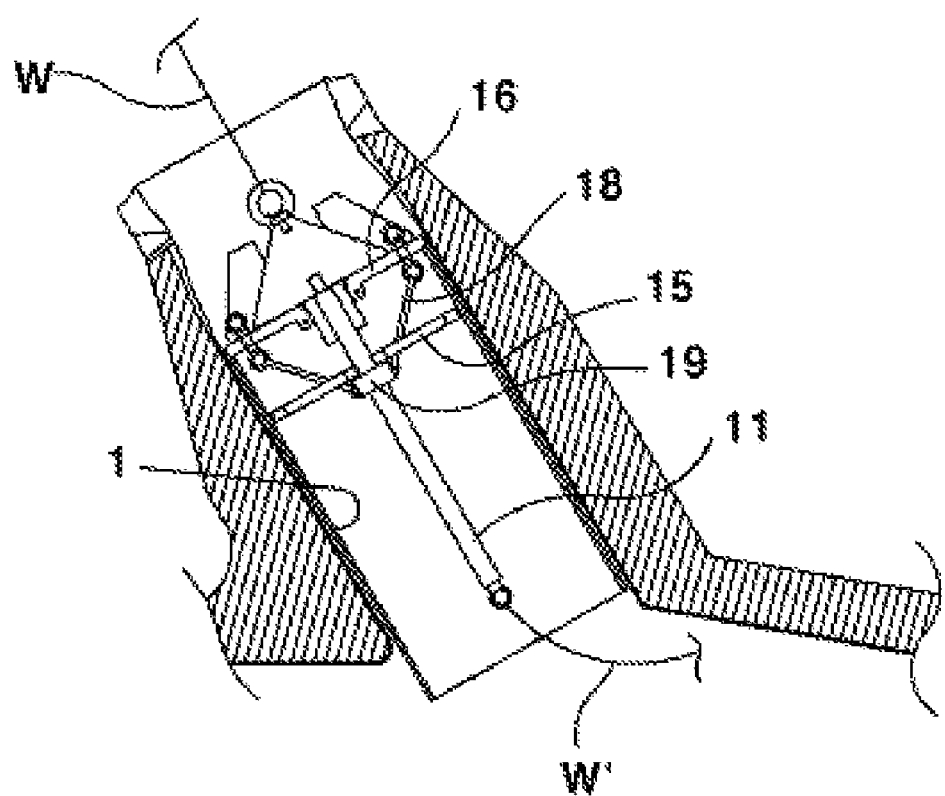

[Fig. 1 1]
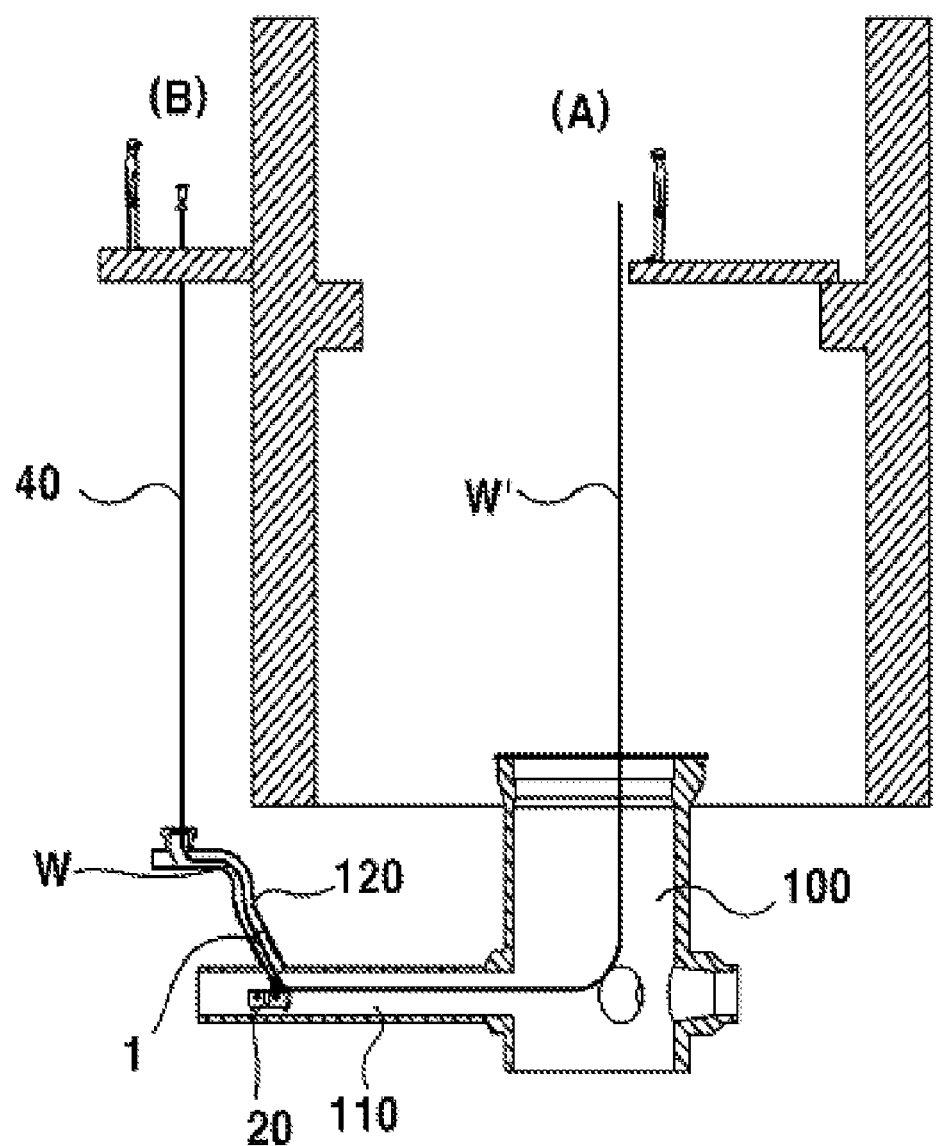

APPARATUS FOR REMOVING THERMAL SLEEVE FROM COLD LEG OF REACTOR COOLANT SYSTEM

CROSS-REFERENCE TO RELATED APPLICATION

This application claims the benefit of Korean Patent Application No. 10-2009-123774 filed Dec. 14, 2009, the contents of each of which are incorporated herein by reference.

BACKGROUND OF THE INVENTION

1. Field of the Invention

The present invention relates to an apparatus for effectively removing a thermal sleeve from a reactor coolant system when the thermal sleeve is unintentionally separated from the system.

2. Description of the Related Art

In general, a reactor coolant system incorporates a safety injection pipe to supply safety injection water, in order to assure cooling of a reactor core in the event of an emergency situation. The safety injection pipe is provided with a thermal sleeve at a junction of the safety injection pipe and a reactor coolant pipe to minimize the effect of thermal shock of a hot reactor coolant and cold safety injection water on the pipes.

The thermal sleeve, installed as described above, may undergo unintentional separation or position displacement due to fluid streams, external vibration, or the like in the course of operation. Once the thermal sleeve is unintentionally separated, it is necessary to effectively remove the separated thermal sleeve so as not to have a negative effect on the operation of a power plant.

However, since the thermal sleeve is located in a highly radioactive region close to a nuclear reactor and is filled with a boric acid solution for radiation shielding, it is actually impossible for a person to access the thermal sleeve.

Therefore, in a conventional method for removing a thermal sleeve, a safety injection pipe is first cut and thereafter, a thermal sleeve is removed by use of cutting equipment. However, implementation of such a cutting operation may disadvantageously increase a removal operation period and also, may entail problems including reliability deterioration due to cutting and repetitious welding of a major system, enormous removal costs, invasion of impurities, and the like.

SUMMARY OF THE INVENTION

The present invention has been made to solve the above problems of the previously described conventional thermal sleeve removal method in which cutting of a safety injection pipe is carried out ahead of removal of a thermal sleeve, and it is an object of the present invention to provide an apparatus capable of easily removing a thermal sleeve without performing a pipe cutting operation, thereby improving workability and system reliability.

In accordance with the present invention, the above and other objects can be accomplished by the provision of an apparatus for removing a thermal sleeve installed at a junction between a coolant pipe of a reactor and a safety injection pipe connected to a midway position of the coolant pipe, the apparatus including a sleeve removal tool including a corn head formed at a front end of a shaft having a predetermined length, a pressure plate provided below the corn head and divided into a plurality of sections so as to be folded or unfolded, and a spring connected to an upper surface of the pressure plate to keep the pressure plate in an unfolded state, a horizontal movement carrier including a plurality of bodies connected to each other by use of a link, a seating rod into which the sleeve removal tool is seated and coupled, and moving wheels installed to the respective bodies for movement of the horizontal movement carrier, and a vertical movement carrier including first and second anti-separation bars provided respectively at front and rear ends thereof to prevent the horizontal movement carrier from being separated from the vertical movement carrier during upward or downward movement thereof inside the reactor, the second anti-separation bar located at the front end of the vertical movement carrier being pivotally rotatable about a hinge.

A slider ring may be movably installed to the shaft of the sleeve removal tool, and a tension release link may be provided to connect the pressure plate and the slider ring to each other.

An introduction eyebolt for connection of an introduction wire rope may be installed at the front end of the shaft of the sleeve removal tool, and a pulling eyebolt for connection of a pulling wire rope may be installed at a rear end of the shaft.

BRIEF DESCRIPTION OF THE DRAWINGS

The above and other objects, features and other advantages of the present invention will be more clearly understood from the following detailed description taken in conjunction with the accompanying drawings, in which:

FIGS. 1A and 1B are views illustrating a removal apparatus according to an embodiment of the present invention,
FIG. 1A being an exploded perspective view, and
FIG. 1B being an assembly perspective view;
FIGS. 2A to 2D are views illustrating a sleeve removal tool according to an embodiment of the present invention,
FIG. 2A being a top perspective view,
FIG. 2B being a bottom perspective view,
FIG. 2C being a side view, and
FIG. 2D being a plan view;
FIGS. 3A to 3C are views illustrating a horizontal movement carrier according to an embodiment of the present invention,
FIG. 3A being an external perspective view,
FIG. 3B being a front view, and
FIG. 3C being a side view;
FIGS. 4A to 4C are views illustrating a vertical movement carrier according to an embodiment of the present invention,
FIG. 4A being an external perspective view,
FIG. 4B being a front view, and
FIG. 4C being a side view;
FIGS. 5A and 5B are views illustrating an installed state of an extension pipe according to an embodiment of the present invention,
FIG. 5A being a partially cut-away view, and
FIG. 5B being a sectional view;
FIG. 6 is a schematic view illustrating a method for removing a thermal sleeve according to an embodiment of the present invention;
FIG. 7 is a view illustrating a vertical movement carrier descent operation;
FIG. 8 is a view illustrating a horizontal movement carrier sliding operation;
FIG. 9 is a view illustrating a sleeve removal tool insertion operation;
FIG. 10 is a view illustrating a completely inserted sleeve removal tool; and FIG. 11 is a schematic view illustrating the removal of a thermal sleeve according to an embodiment of the present invention.

DETAILED DESCRIPTION OF THE INVENTION

Hereinafter, an exemplary embodiment of the present invention will be described in detail with reference to the accompanying drawings.

Referring to FIGS. 1A to 5B illustrating a configuration of a thermal sleeve removal apparatus according to the exemplary embodiment of the present invention, the thermal sleeve removal apparatus includes a sleeve removal tool 10 to forcibly remove a thermal sleeve 1 installed in a safety injection pipe 120, a horizontal movement carrier 20 to transport the sleeve removal tool 10 along a coolant pipe 110 via horizontal sliding movement thereof, and a vertical movement carrier 30 to move the horizontal movement carrier 20 up and down within a reactor 100, and an extension pipe 40 connected to a check valve removal position of the safety injection pipe 120 so as to guide a wire rope W and a cable for handling of the sleeve removal tool 10 and the horizontal movement carrier 20.

More specifically, the sleeve removal tool 10, as shown in FIGS. 2A to 2D, includes a corn head 12 and an introduction eyebolt 13 provided at a front end of a shaft 11, a pulling eyebolt 14 provided at a rear end of the shaft 11, and a guide wheel 15 provided at an approximately middle position of the shaft 11 to guide insertion of the sleeve removal tool 10 into the safety injection pipe 120. In addition, a pressure plate 16 is provided below the corn head 12 to maximize the effect of hydraulic pressure inside the safety injection pipe 120. To this end, the pressure plate 16 has a foldable form and is divided into a plurality of sections. A spring 17 is connected to an upper surface of the pressure plate 16 to apply an elastic force to the pressure plate 16. One end of a tension release link 18 is connected to a lower surface of the pressure plate 16 to release a tensile force applied to the pressure plate 16, and the other end of the tension release link 18 is connected to a slider ring 19 that can slide along the shaft 11.

In particular, it is preferable that the slider ring 19 be provided with a wire connection loop 19a for connection of a wire rope used to forcibly release the tensile force applied to the pressure plate 16.

The horizontal movement carrier 20, as shown in FIGS. 3A to 3C, consists of two bodies 21 connected to each other by use of a link 22. The two bodies 21 have cutout edges 21a facing each other to define a space therebetween so that the bodies 21 can be tilted toward or away from each other by a predetermined inclination angle. A seating rod 23 is provided at a rear end of the horizontal movement carrier 20 so that the shaft 11 of the sleeve removal tool 10 can be inserted into and seated in the seating rod 23. In addition, moving wheels 24 are mounted to the bottom and sidewalls of the respective bodies 21. Reference numeral 25 represents a wire connection loop provided for connection of wire ropes W and W'. The wire connection loop 25 may be provided at the same position as the seating rod 23 for the insertion and seating of the sleeve removal tool 10. This may assure the sleeve removal tool 10 to be accurately positioned at an entrance of the safety injection pipe 120 via sliding movement of the horizontal movement carrier 20.

The vertical movement carrier 30, as shown in FIGS. 4A to 4C, includes a first anti-separation bar 31 provided at a rear end thereof to prevent separation of the horizontal movement carrier 20, a second anti-separation bar 32 pivotally coupled to a front end thereof by use of a hinge 32a, and a guiding floor 33 protruding forward from the bottom thereof. Reference numeral 35 represents a wire connection loop for connection of a wire rope used to ascend or descend the vertical movement carrier 30.

The extension pipe 40, as shown in FIGS. 5A and 5B, has a bent lower end portion 41 obliquely extending by a predetermined guidance angle to allow an initially inserted cable to move toward the coolant pipe 110.

Hereinafter, a method for removing a thermal sleeve using the apparatus of the present invention having the above described configuration will be described with reference to FIGS. 6 to 11.

<Extension Pipe Installation Operation ST 1>

First, prior to performing the method of the present invention, a core support barrel (CSB) is reinstalled in a cavity of the reactor 100 and then, the level of a fluid inside the cavity of the reactor 100 is lowered from 140 ft to 110 ft, causing the safety injection pipe 120 to be exposed. Once the safety injection pipe 120 is exposed, a check valve (not shown) provided at the safety injection pipe 120 is disassembled to remove an element accommodated in the safety injection pipe 120 and thereafter, the extension pipe 40 having a predetermined length is connected to the safety injection pipe 120.

More specifically, typically, the cavity of the reactor, in which the core support barrel as a highly radioactive object is accommodated, is always filled with a boric acid solution to prevent the core support barrel from being exposed to the atmosphere. In general, the boric acid solution is charged to the level of 140 ft, the thermal sleeve 1 is located at a height of approximately 105 ft, and the check valve (not shown) of the safety injection pipe 120 is typically located at a height of 110 ft.

Accordingly, if it is attempted to directly install a wire rope to the check valve located at the height of 110 ft, this may cause leakage of the boric acid solution because the boric acid solution is charged to the level of 140 ft in the cavity of the reactor. For this reason, it is necessary to install the extension pipe 40 along with a flange cover 42 after the level of the boric acid solution is lowered to 110 ft as described above. With this installation, it is possible to set a working location at a height of approximately 145 ft.

<Cable and Wire Rope Operation ST 2>

Next, if a worker A in a secondary working zone B that is set at the height of 145 ft via installation of the extension pipe 40 as described above slowly inserts a cable into the extension pipe 40, the inserted cable is guided into the safety injection pipe 120 and the coolant pipe 110 by way of the bent lower end portion 41 of the extension pipe 40.

Once the cable is guided to the interior of the reactor 100 via continuous insertion thereof, a worker in a primary working zone A provided at an upper end of the reactor 100 is able to grip and lift the cable by use of a nipper.

Thereafter, if the worker in the secondary working zone B pulls the cable after a required number of wire ropes W are connected to the lifted cable, the wire ropes W are pulled along with the cable, thereby being able to be moved toward the secondary working zone B by way of the interior of the reactor 100, the coolant pipe 110, the safety injection pipe 120 and the extension pipe 40.

<Vertical Movement Carrier Descent Operation ST 3>

The sleeve removal tool 10, the horizontal movement carrier 20 and the vertical movement carrier 30, which constitute the removal apparatus of the present invention, are initially placed on the primary working zone A provided at the upper end of the reactor 100. In this case, one ends of the wire ropes W are connected respectively to one side of the respective devices (i.e. the sleeve removal tool 10, the horizontal movement carrier 20, and the vertical movement carrier 30) for movement and installation of the devices, and additional pulling wire ropes W' are connected to the other side of the respective devices. In a state wherein the sleeve removal tool 10 is inserted in the seating rod 23 of the horizontal movement carrier 20 and the horizontal movement carrier 20 is seated in the vertical movement carrier 30 as shown in FIG. 1B, the vertical movement carrier 30 is guided to slowly descend inside the reactor 100.

If the vertical movement carrier 30 continuously descends until it reaches an entrance of the coolant pipe 110, the guiding floor 33 of the vertical movement carrier 30 is caught by the entrance of the coolant pipe 110. Thereby, as shown in FIG. 7 in the enlarged view of the portion "a" of FIG. 6, the vertical movement carrier 30 is located at the entrance of the coolant pipe 110.

At this time, as the worker in the primary working zone A pulls up the wire rope W connected to the second anti-separation bar 32 to allow the second anti-separation bar 32 to be pivotally rotated and raised about the hinge 32a, the horizontal movement carrier 20 seated in the vertical movement carrier 30 is kept in a sliding movable state.

<Horizontal Movement Carrier Sliding Operation ST 4>

After the descent of the vertical movement carrier 30 is completed at the fixed position, the worker in the secondary working zone B pulls the wire rope W connected to the horizontal movement carrier 20, whereas the worker in the primary working zone A slowly releases the pulling wire rope W'. Thereby, as shown in FIG. 8 in the enlarged view of the portion "b" of FIG. 6, the horizontal movement carrier 20 is moved along the coolant pipe 110.

In particular, since the horizontal movement carrier 20 consists of the two bodies 21 connected to each other by use of the link 22, the horizontal movement carrier 20 can smoothly pass through even a curved portion of the coolant pipe 110. In this way, the horizontal movement carrier 20 can slide and move to a junction between the safety injection pipe 120 and the coolant pipe 110.

<Sleeve Removal Tool Insertion Operation ST 5>

In a state wherein the sliding movement of the horizontal movement carrier 20 is completed, if the worker in the secondary working zone B pulls the wire rope W connected to the sleeve removal tool 10 that is seated in the seating rod 23, the sleeve removal tool 10, as shown in FIG. 9, is guided upward into the thermal sleeve 1 that is an object to be removed from the safety injection pipe 120.

In this case, since an inner diameter of the thermal sleeve 1 decreases as the sleeve removal tool 10 is inserted into the thermal sleeve 1, it will be appreciated that the pressure plate 16 of the sleeve removal tool 10 may be temporarily kept in a downwardly folded state by overcoming the elasticity of the spring 17.

Then, if the sleeve removal tool 10 completely passes through the thermal sleeve 1, as shown in FIG. 10, the pressure plate 16 is unfolded to an original posture thereof by the elasticity of the spring 17, whereby the insertion of the sleeve removal tool 10 is completed.

<Thermal Sleeve Removal Operation ST 6>

After the worker in the secondary working zone B closes an open upper end of the extension pipe 40 to prevent leakage of the solution in a state wherein the insertion of the sleeve removal tool 10 is completed, any one or both of a safety injection pump and a container water spray pump (not shown), which are previously installed at a front end of the safety injection pipe 120, are simultaneously driven to generate high flow-rate hydraulic pressure inside the safety injection pipe 120. The generated hydraulic pressure is applied to the corn head 12 of the sleeve removal tool 10 and the upper surface of the pressure plate 16, generating a force pushing the thermal sleeve 1 downward and consequently, allowing the thermal sleeve 1 to be forcibly separated and removed from the safety injection pipe 120.

In this case, it can be appreciated that the unfolded pressure plate 16 serves as a dam, enabling transmission of the strong hydraulic pressure.

For reference, the safety injection pump and the container water spray pump are typically installed to supply cooling water in the event of an emergency situation of the reactor and therefore, a detailed functional description and an illustration thereof are omitted herein.

The separated thermal sleeve 1 drops and is seated on the horizontal movement carrier 20 along with the sleeve removal tool 10 for collection of the thermal sleeve 1.

<Thermal Sleeve Transportation Operation ST 7>

As the worker in the primary working zone A slowly pulls the pulling wire rope W' connected to the horizontal movement carrier 20 and simultaneously, the worker in the secondary working zone B slowly releases the wire rope W, the horizontal movement carrier 20 is guided to slide and move toward the reactor 100 along the coolant pipe 110 and thereafter, is introduced into the vertical movement carrier 30.

Once the introduction of the horizontal movement carrier 20 is confirmed, the second anti-separation bar 32 is again pivotally rotated and lowered to stably prevent separation of the horizontal movement carrier 20 and the vertical movement carrier 30 is pulled to ascend inside the reactor 100, whereby the removal operation of the present invention is completed.

In the meantime, if the removal of the thermal sleeve 1 ends in failure, it is necessary to remove and collect the sleeve removal tool 10 from the safety injection pipe 120. However, since the pressure plate 16 is horizontally expanded and is caught at an upper end of the thermal sleeve 1, collection of the sleeve removal tool 10 may be difficult.

Therefore, in this case, it is necessary for the worker in the primary working zone A to pull the wire rope connected to the wire connection loop 19a of the slider ring 19. Thereby, as the slider ring 19 is moved downward along the shaft 11, the pressure plate 16 is folded downward by the tension release link 18 connected between the slider ring 19 and the pressure plate 16. In this way, the pressure plate 16 can be released from the thermal sleeve 1.

Accordingly, if the wire rope W' connected to the pulling eyebolt 14 is pulled at this state, the sleeve removal tool 10 can easily pass through and be discharged out of the safety injection pipe 120 and the thermal sleeve 1 and thereafter, can drop into the horizontal movement carrier 20, enabling easy collection of the sleeve removal tool 10.

With use of the above described apparatus of the present invention, the apparatus can be installed or removed only by wire rope handling of the workers in the primary working zone A and the secondary working zone B without a pipe cutting operation and the thermal sleeve 1 can be removed by the hydraulic pressure applied to the safety injection pipe and the apparatus. Accordingly, the present invention can prevent problems, such as invasion of impurities, repetitious pipe welding, etc.

Further, since a remote operation and an underwater operation of the apparatus using the wire ropes are possible, it is possible to assure worker safety by minimizing radiation exposure.

As apparent from the above description, with use of a thermal sleeve removal apparatus according to the present invention, if a thermal sleeve installed in a safety injection pipe is unintentionally separated, it is possible to remove the thermal sleeve without implementation of a pipe cutting operation. This has the effect of preventing invasion of impurities into pipes and preventing reliability deterioration due to repetitious welding of pipes.

In particular, the thermal sleeve removal apparatus according to the present invention can allow workers in working zones distant from each other to perform a remote operation and an underwater operation by use of wire ropes. This has the effect of minimizing a negative effect on the workers due to radiation exposure.

Although the preferred embodiment of the present invention has been disclosed for illustrative purposes, those skilled in the art will appreciate that various modifications, additions and substitutions related to a configuration of the removal apparatus of the present invention are possible by those skilled in the art.

However, the various modifications, additions and substitutions should not be understood as being outside of the scope and spirit of the invention and should be understood as being included in the accompanying claims of the present invention.

What is claimed is:

1. An apparatus for removing a thermal sleeve from a cold leg of a reactor coolant system, the thermal sleeve being installed to minimize the effect of thermal shock at a junction between a coolant pipe of a reactor and a safety injection pipe connected to a midway position of the coolant pipe, the apparatus comprising:
   a sleeve removal tool including a corn head formed at a front end of a shaft having a predetermined length, a pressure plate provided below the corn head to maximize the effect of hydraulic pressure inside the safety injection pipe, the pressure plate being divided into a plurality of sections so as to be folded or unfolded, a spring connected to an upper surface of the pressure plate to keep the pressure plate in an unfolded state, and a guide wheel provided at a midway position of the shaft to guide the sleeve removal tool into the safety injection pipe;
   a horizontal movement carrier including a plurality of bodies connected to each other by use of a link, a seating rod into which the sleeve removal tool is seated and coupled, and moving wheels installed to the respective bodies so as to allow the horizontal movement carrier to horizontally slide and move along the coolant pipe; and
   a vertical movement carrier including first and second anti-separation bars provided respectively at front and rear ends thereof to prevent the horizontal movement carrier from being separated from the vertical movement carrier during upward or downward movement thereof inside the reactor, the second anti-separation bar located at the front end of the vertical movement carrier being pivotally rotatable about a hinge.

2. The apparatus according to claim 1, further comprising an extension pipe connected to the safety injection pipe for connection of wire ropes required for remote movement of the sleeve removal tool and the horizontal movement carrier,
   wherein the extension pipe has a bent lower end portion obliquely extending toward the coolant pipe by a predetermined guidance angle, and
   wherein a flange cover is provided at a coupling region of the extension pipe and the safety injection pipe to prevent fluid leakage under the effect of the hydraulic pressure inside the safety injection pipe.

3. The apparatus according to claim 1, wherein a slider ring is movably installed to the shaft of the sleeve removal tool, and a tension release link is provided to connect the pressure plate and the slider ring to each other.

4. The apparatus according to claim 1, wherein an introduction eyebolt for connection of an introduction wire rope is installed at the front end of the shaft of the sleeve removal tool, and a pulling eyebolt for connection of a pulling wire rope is installed at a rear end of the shaft.

5. The apparatus according to claim 4, wherein the slider ring has a wire connection loop for connection of a wire rope required to forcibly release a tensile force applied to the pressure plate.

6. The apparatus according to claim 3, wherein an introduction eyebolt for connection of an introduction wire rope is installed at the front end of the shaft of the sleeve removal tool, and a pulling eyebolt for connection of a pulling wire rope is installed at a rear end of the shaft.

7. The apparatus according to claim 6, wherein the slider ring has a wire connection loop for connection of a wire rope required to forcibly release a tensile force applied to the pressure plate.

8. The apparatus according to claim 1, wherein the bodies of the horizontal movement carrier respectively have cutout edges facing each other.

9. The apparatus according to claim 1, wherein the horizontal movement carrier has a wire connection loop for connection of the introduction and pulling wire ropes, and the wire connection loop is formed at the same position as the seating rod.

10. The apparatus according to claim 8, wherein the horizontal movement carrier has a wire connection loop for connection of the introduction and pulling wire ropes, and the wire connection loop is formed at the same position as the seating rod.

* * * * *